Patented July 17, 1923.

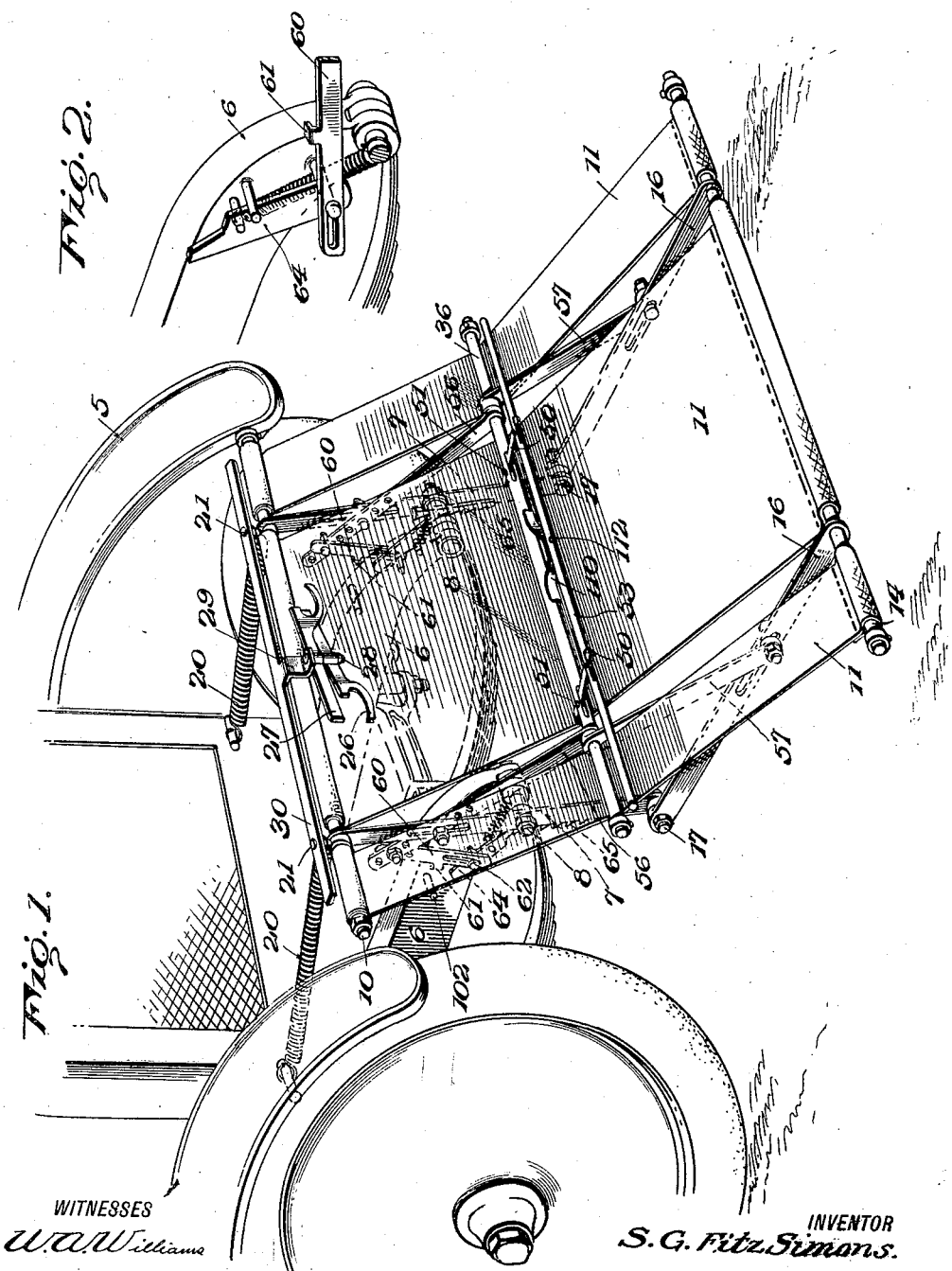

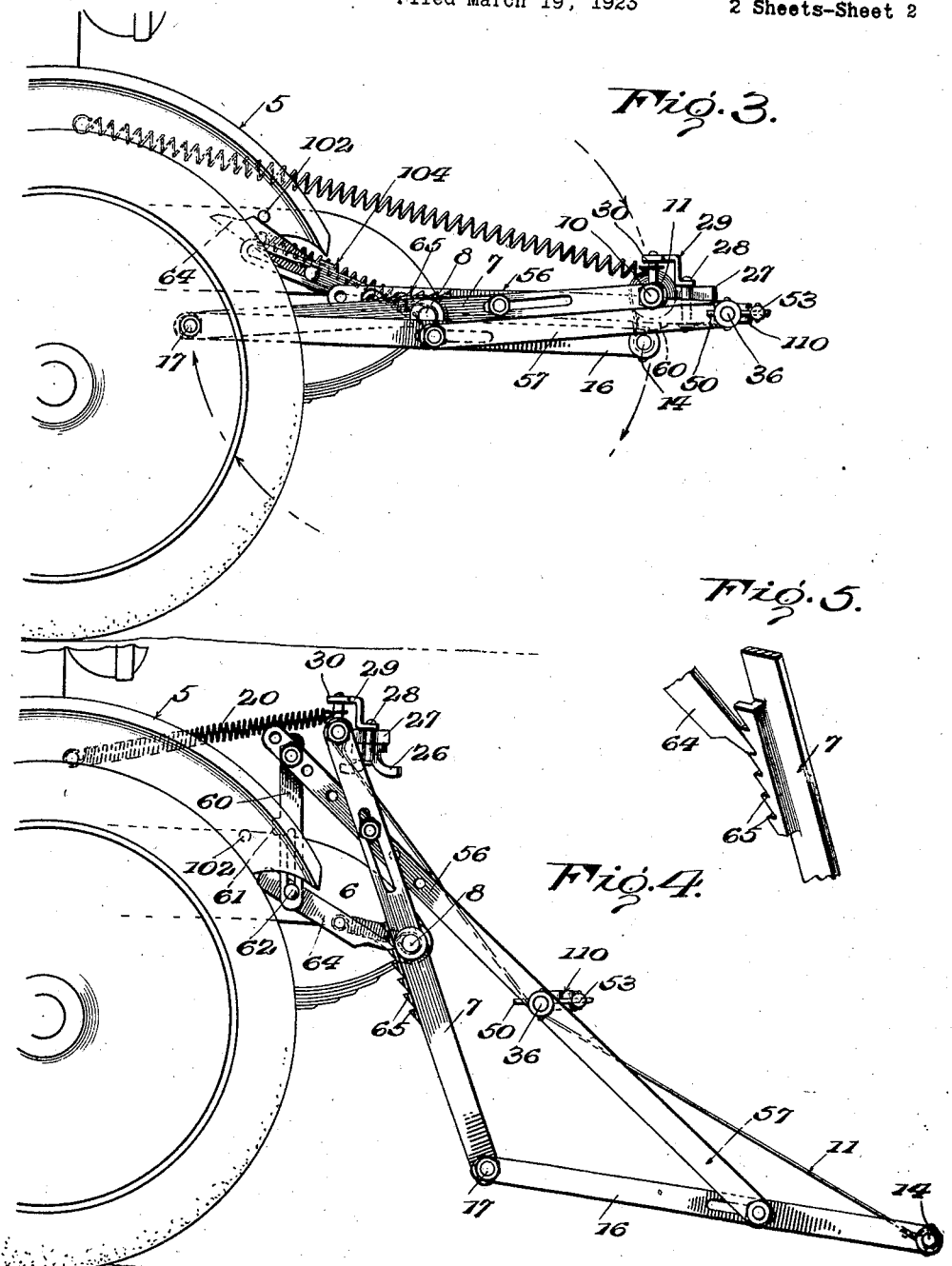

1,462,104

UNITED STATES PATENT OFFICE.

SAMUEL G. FITZSIMONS, OF CHARLESTON, SOUTH CAROLINA.

AUTOMOBILE FENDER.

Application filed March 19, 1923. Serial No. 626,070.

*To all whom it may concern:*

Be it known that I, SAMUEL G. FITZSIMONS, a citizen of the United States, and resident of Charleston, in the county of Charleston and State of South Carolina, have invented certain new and useful Improvements in Automobile Fenders, of which the following is a specification.

This invention relates to automobile fenders and is an improvement over the construction illustrated in my United States Patent No. 1,430,224, granted September 26, 1922.

Briefly stated an important object of this invention is to provide an automobile fender which is rigidly and securely held in its open or operative position subsequent to striking a person and more specifically the invention aims to provide simple means whereby one side is prevented from sagging when open.

A further object is to provide an automobile fender which is of highly simplified construction, neat in appearance and cheap to manufacture.

Other objects and advantages will be apparent during the course of the following description.

In the accompanying drawing forming a part of this application and in which like numerals are employed to designate like parts throughout the same, Figure 1 is a perspective of the fender open.

Figure 2 is a detail perspective illustrating a locking pawl and associated parts embodied in the invention.

Figure 3 is a side elevation of the fender set for operation.

Figure 4 is a side elevation of the fender open.

Figure 5 is a detail perspective illustrating the means for holding the fender open.

In the drawing, wherein for the purpose of illustration is shown a preferred embodiment of the invention the numeral 5 generally designates a motor vehicle having a frame 6 to which the improved fender may be connected. As illustrated in Figure 1 a pair of main levers 7 are pivoted intermediate their ends to the extended terminal portions of the frame by pivot elements 8 and the upper portions of the levers 7 have connection with a spring roller 10 about which curtains or pick-up sheets 11 are trained.

When the apparatus is in its set position as illustrated in Figure 3 the sheets or curtains 11 are trained about the upper spring roller 10 and when the device is in its open or operative position as illustrated in Figure 4 the sheets or curtains are open or unrolled.

The curtains are connected at their outer ends to a lower curtain rod or roller 14 carried by roller supporting arms 16. The rear ends of the roller supporting arms 16 are pivoted as indicated at 17 to the lower portions of the main levers 7 and when the main levers 7 are swung upwardly and rearwardly as illustrated in Figure 1 the lower portions of the levers 7 are swung downwardly and forwardly for advancing the arms 16.

When the curtain supporting roller 10 is released by means to be hereinafter described coiled springs 20 connected to lugs 21 on the roller 10 swing the roller upwardly and rearwardly and this movement of the roller will move the arms 16 downwardly. It might be stated that when the parts are in a set position the springs 20 hold the same in that position and when a person is struck the subsequent upward movement of the roller 10 permits the spring to immediately swing the parts to the position illustrated in Figure 1.

When the parts are in the position illustrated in Figure 3 the lower roller 14 is engaged by the longitudinally curved slotted terminal portions 26 of latches 27. The latches 27 are pivoted intermediate their ends as indicated at 28 to a depending lug 29 carried by the intermediate portion of a protector strip 30. The protector strip 30 overhangs the curtains 11 and is secured to the levers 7 by the lugs 21.

Referring again to the latches 27 it will be seen that the longitudinally curved slotted terminal portions of the same receive the lower roller 14 so as to hold the same in a set position. As the actuating ends or what might be said to be the contact ends of the latches 27 are arranged directly behind the contact bar 36 the rearward movement of the contact bar will swing the latches 27 on their pivots so that the curved terminal portions 26 will be moved out of supporting engagement with the lower roller 14. More specifically when a pedestrian is struck by the contact bar 36, the contact bar will move rearwardly and swing the latches 27 on their pivots 28 so as to release the bar 14 and permit the same to assume its operative position illustrated in Figure 1.

It might be said that the terminal portions 26 are more or less hooked and therefore are not easily released from engagement with the bar 14 as a result of vibrations or ordinary movement of the vehicle. The terminal portions 26 of the latches 27 are released from engagement with the bar 14 only as a result of the rearward movement of the contact bar 36 which forcibly swings the latches 27 on their pivots 28.

To positively prevent the accidental movement of the latches 27 on the pivot pin 28 the contact bar is provided with a pair of pivoted locking lugs 50 which operate in slots in the contact bar. It will be seen that the lugs 50 are pivoted intermediate their ends as indicated at 51 to the contact bar 36 and are normally maintained in engagement with the ends of the latches 27 by a tripping rod 53.

When the contact bar 36 is struck the links 56 and 57 connected thereto will swing the levers 7 on their pivots and will move the arms 16 downwardly. Also this rearward movement of the contact bar 36 will swing the pawl operating links 60 on their pivots 61. This swinging movement of the pawl operating links will cause the lugs 61 carried thereby to swing the pawls 64 on their pivots 62 so that the pawls 64 will engage the ratchet teeth 65 on the rear side of the levers 7.

When the ratchet bars or ratchets 64 are thus engaged with the levers 7 the parts are securely held in their operative positions and will not sag as a result of weight on one side of the center.

It will be seen that the weight of a person is not only supported by the roller supporting arms 15 but by the supporting bars 17.

In operation the fender is set as illustrated in Figure 3 with the contact bar 36 and the tripping rod 53 arranged beyond the other parts so that if a person is hit these parts will swing the links 56 and 57 to the position illustrated and this movement of the links 56 and 57 will separate the rollers 10 and 14. With the rollers 10 and 14 thus separated the pick up curtain 11 will be spread for receiving the person struck by the vehicle.

It will be seen that the rear ends of the links 56 and 57 have connection with the members 60 and the members 60 operate the pawls 64 so that the pawls are in turn engaged with the teeth 65 whereby to hold the lever 7 in a more or less rigid position so that sagging of the fender on one side is prevented.

Attention is directed to Figure 3 which illustrates that the pawls 64 are normally held in engagement with the lugs 102 and when the laterally projecting members 61 swing the same beyond dead center the pointed ends of the pawls will engage the ratchet teeth 65 as illustrated in Figure 1.

The springs 104 connected to the pawls and to the pivot elements 8 normally hold the pawls in engagement with the stop lugs 100 and when the apparatus is swung to its operative position the coiled spring will move the pawl to its operative position and hold the same in engagement with the ratchet teeth 65.

In use the tripping rod 65 is normally maintained in spaced relation to the tripping rod 36 by means of a longitudinally curved spring 110, the intermediate portion of which is secured to the rod 53 as indicated at 112. When the rod 53 which is spring urged to a position in spaced relation to the bar 36 is engaged by a person the pressure of the spring 110 will be overcome and the holding members 50 will be released from locking engagement with the ends of the latches 27 whereby the lower rod 14 may drop to its operative position as illustrated in Figure 1.

With reference to the foregoing description taken in connection with the accompanying drawings it will be seen that an automobile fender or pick-up device constructed in accordance with this invention will be extremely simple to apply to an automobile and will effectively open when struck for picking up a pedestrian, whereby the vehicle will not be likely to seriously injure the person struck.

Having thus described the invention, what is claimed is:—

1. An automobile fender comprising a pair of main levers having means whereby the same may be pivoted intermediate their ends to a motor vehicle, a roller carried by the terminal portions of said levers, supporting arms pivoted to the lower portions of said levers, a second roller carried by the outer terminal portions of said arms, and links connected to said arms and to said levers, a contact bar carried by said links, and a curtain connected to said rollers.

2. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, and means whereby to swing the rollers to their operative positions when released.

3. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, means whereby to swing the rollers to their operative positions when released, a protector strip overhanging one of said rollers, and a pair of latches pivoted intermediate their ends to said protector strip and having slotted terminal portions to engage one of the rollers whereby to hold the same in a set position.

4. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, means whereby to swing the rollers to their operative positions when released, a protector strip overhanging one of said rollers, a pair of latches pivoted intermediate their ends to said protector strip and having slotted terminal portions to engage one of the rollers whereby to hold the same in a set position, and locking lugs pivoted intermediate their ends to said contact bar and engaged with said latches whereby to hold the same against accidental movement.

5. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, means whereby to swing the rollers to their operative positions when released, a protector strip overhanging one of said rollers, a pair of latches pivoted intermediate their ends to said protector strip and having slotted terminal portions to engage one of the rollers whereby to hold the same in a set position, locking lugs pivoted intermediate their ends to said contact bar and engaged with said latches whereby to hold the same against accidental movement, and a tripping bar having pivotal connection with the outer portions of said locking lugs, and arranged in advance of said contact bar.

6. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, means whereby to swing the rollers to their operative positions when released, a protector strip overhanging one of said rollers, a pair of latches pivoted intermediate their ends to said protector strip and having slotted terminal portions to engage one of the rollers whereby to hold the same in a set position, locking lugs pivoted intermediate their ends to said contact bar and engaged with said latches whereby to hold the same against accidental movement, a tripping bar having pivotal connection with the outer portions of said locking lugs, and arranged in advance of said contact bar, ratchet operating links pivoted to certain of said first named links, ratchets arranged adjacent to said ratchet operating links and being spring actuated, said levers being provided with ratchet teeth engaged by the ratchets.

7. A fender for motor vehicles comprising a pair of levers having means whereby the same may be pivoted intermediate their ends to a motor vehicle, roller supporting arms pivoted at their rear ends to the lower portions of said levers, rollers carried by said arms and said levers, a curtain connected to said rollers, pairs of links connected to said levers and said arms, a contact bar connected to said links, means whereby to swing the rollers to their operative positions when released, a protector strip overhanging one of said rollers, a pair of latches pivoted intermediate their ends to said protector strip and having slotted terminal portions to engage one of the rollers whereby to hold the same in a set position, locking lugs pivoted intermediate their ends to said contact bar and engaged with said latches whereby to hold the same against accidental movement, a tripping bar having pivotal connection with the outer portions of said locking lugs, and arranged in advance of said contact bar, ratchet operating links pivoted to certain of said first named links, ratchets arranged adjacent to said ratchet operating links and being spring actuated, said levers being provided with ratchet teeth engaged by said ratchets, and spring means normally holding said ratchets in inoperative positions and adapted to swing the ratchets into engagement with said ratchet teeth when the apparatus is sprung.

SAMUEL G. FITZSIMONS.